United States Patent
Gan et al.

(10) Patent No.: US 8,340,020 B2
(45) Date of Patent: Dec. 25, 2012

(54) METHOD AND GATEWAY FOR ROUTING INTERNATIONAL MOBILE TELEPHONE CALLS

(75) Inventors: Chai Hien Gan, Hsinchu (TW); Meng Hsun Tsai, Taipei County (TW); Yi Bing Lin, Hsinchu County (TW); Ching Feng Liang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 973 days.

(21) Appl. No.: 12/395,588

(22) Filed: Feb. 27, 2009

(65) Prior Publication Data
US 2010/0034198 A1  Feb. 11, 2010

(30) Foreign Application Priority Data
Aug. 6, 2008 (TW) .............................. 97129769 A

(51) Int. Cl.
*H04W 4/00* (2009.01)
(52) U.S. Cl. ........................................ 370/328
(58) Field of Classification Search .......... 370/328–339; 455/432.1–445
See application file for complete search history.

(56) References Cited

U.S. PATENT DOCUMENTS

| | | | |
|---|---|---|---|
| 6,006,094 A * | 12/1999 | Lee | 455/445 |
| 6,580,907 B2 | 6/2003 | Hughes et al. | |
| 6,603,968 B2 * | 8/2003 | Anvekar et al. | 455/433 |
| 7,369,848 B2 * | 5/2008 | Jiang | 455/432.3 |
| 2005/0186960 A1 | 8/2005 | Jiang | |
| 2007/0167167 A1 | 7/2007 | Jiang | |

FOREIGN PATENT DOCUMENTS
TW 200727675 7/2007

OTHER PUBLICATIONS

Lin, Eliminating Tromboning Mobile Call Setup for International Roaming Users, IEEE, 6 pages, Jan. 2009.*
Lin, Reducing International Roaming Call Costs with Multiple Mobile Phone Numbers, IEEE, 3 pages, Jul. 2008.*
Notice of Allowance for corresponding TW application No. 097129769 dated Apr. 30, 2012 cites TW 200727675.

* cited by examiner

*Primary Examiner* — Frank Duong
(74) *Attorney, Agent, or Firm* — WPAT, P.C.; Anthony King

(57) ABSTRACT

A gateway for routing an international mobile telephone call comprises a storage device and a cost-saving routing module. The storage device is configured to store a mapping table and a call record table. The mapping table records a mobile phone number of a roaming subscriber and a fixed network number, and the call record table records a caller's phone number and the mobile phone number of the roaming subscriber. The cost-saving routing module is configured to establish a connection in accordance with the mapping table and call record table.

28 Claims, 6 Drawing Sheets

US 8,340,020 B2

METHOD AND GATEWAY FOR ROUTING INTERNATIONAL MOBILE TELEPHONE CALLS

BACKGROUND OF THE INVENTION

1. Field of the Invention

The present invention relates to a telecommunication service, and more particularly, to a gateway and routing method for optimizing international roaming call services.

2. Description of the Related Art

With the widespread development of mobile telecommunication technology, users can now enjoy mobile telephone service at any location and are not limited to a fixed location where wire equipment has been deployed. In particular, telecommunication providers offer international roaming call services that allow mobile subscribers to easily communication using their mobile phones. However, the international roaming fee is very expensive because the roaming communication usually goes through two international trunks.

Although there are many low cost approaches in the market, such approaches either require the user to dial several times or require the purchase of additional devices such as SIM cards or external boxes. As a result, such approaches might save money but do so at the expense of lost convenience for the user. Other approaches achieve cost savings by modifying existing mobile communication systems, but the cost of replacing existing communication nodes is relatively high. In brief, a solution is needed to meet the demands of both convenience and routing cost for international roaming call services.

SUMMARY OF THE INVENTION

The exemplary embodiment consistent with the present invention proposes a gateway for routing an international mobile telephone call. The gateway comprises a storage device and a cost-saving routing module. The storage device is configured to store a mapping table and a call record table. The mapping table records a mobile phone number of a roaming subscriber and a fixed network number or local phone number, and the call record table records a caller's phone number and the mobile phone number of the roaming subscriber. The cost-saving routing module is configured to establish a connection in accordance with the mapping table and call record table.

The exemplary embodiment consistent with the present invention proposes a method for routing an international mobile telephone call, comprising the steps of: recording a mobile phone number of a roaming subscriber and a fixed network number by a mapping table; and recording a caller's phone number and the mobile phone number of the roaming subscriber by a call record table.

The exemplary embodiment consistent with the present invention proposes a method for routing an international mobile telephone call and controlling roaming setup of a mobile phone, comprising the steps of: recording a current location; determining whether the mobile phone is operating in a roaming mode after the mobile phone receives an incoming call from a caller; issuing a rejection if the determining result is affirmative; and calling back to a target PSTN gateway to establish a connection between the mobile phone and the caller.

BRIEF DESCRIPTION OF THE DRAWINGS

The exemplary embodiment consistent with the invention will be described according to the appended drawings in which.

PREFERRED EMBODIMENT OF THE PRESENT INVENTION

The exemplary embodiment consistent with the present invention proposes a public switched telephone system (PSTN) gateway for routing an international mobile telephone call. In addition to deploying the PSTN gateways in the originating country, the subscriber's home country and the roaming country, the roaming service provider needs to provide the roaming subscriber with multi-country fixed network number covering the countries the roaming subscriber usually travels to. For example, the subscriber requests a roaming service from a Taiwan roaming service provider. Because the subscriber usually visits the United States and Japan, the roaming service provider assigns a mobile phone number +886-9311111111, a U.S. fixed network number +1-4433333333 and a Japanese fixed network number +81-556666666 to the subscriber.

Figure 1:
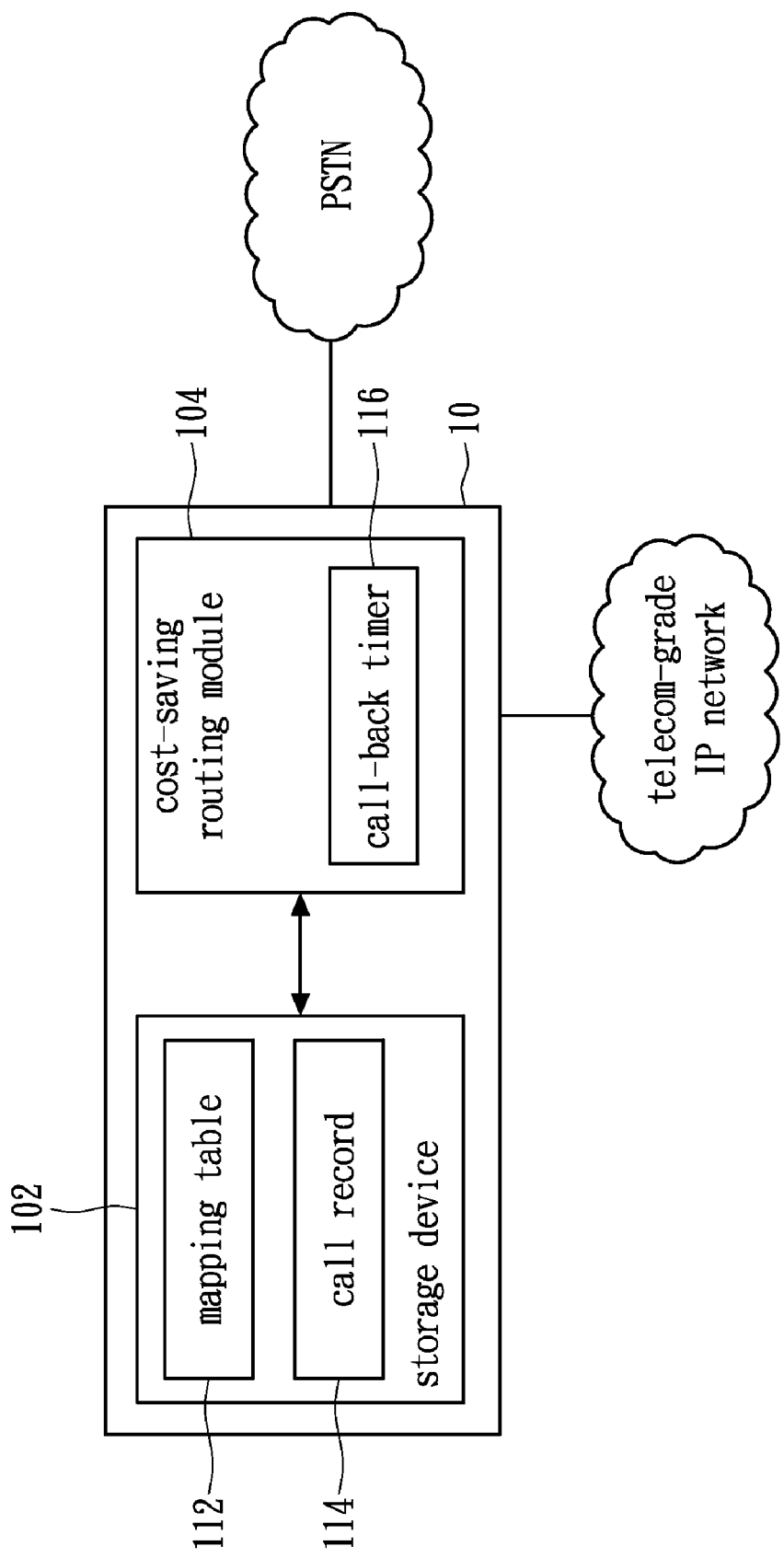
FIG. 1 shows a public switched telephone network system gateway structure according to one embodiment of the present invention.

FIG. 1 shows a PSTN gateway structure 10 according to one embodiment of the present invention. The gateway structure 10 includes a storage device 102 and a cost-saving routing module 104. The storage device 102 is used to store a mapping table 112 and a call record table 114, where the mapping table 112 is used to record a mobile phone number of a roaming subscriber and a local phone number (typically a fixed network number) corresponding to an originating place or a target place where the roaming subscriber is located, and the call record table 114 records a caller's phone number and the mobile phone number of the roaming subscriber. When the caller intends to have a telephone communication with the roaming subscriber, he or she dials the fixed network number.

The PSTN gateway operates in an originating mode, a home mode or a target mode. The originating mode defines the condition that the PSTN gateway is at the same place with the caller. The home mode defines the condition that the PSTN gateway is in the subscriber's home country. The target mode defines the condition that the PSTN gateway is where the subscriber is roaming.

When the PSTN gateway 10 is operating in an originating mode, the cost-saving routing module 104 checks the call record table 114 and makes a connection with the home gateway (the gateway located in the subscriber's home country) through the Internet when a caller calls the roaming subscriber.

When the PSTN gateway 10 is operating in a home mode, after the home PSTN gateway receives a connection request from the originating PSTN gateway or an incoming call request from the caller, the cost-saving routing module 104 checks the call record table 114, establishes a connection between the caller and callee (the roaming subscriber) or actuates a call-back timer 116 after a rejection response from the roaming subscriber is received. If no call-back request is received before the call-back timer 116 expires, the cost-saving routing module 104 clears the call record table 114 and releases the connection between the caller and callee. Alternatively, if a call-back request is received before the call-back timer 116 expires, the cost-saving routing module 104 checks the call record table 114 and transfer the call-back request to the originating PSTN gateway.

When the PSTN gateway 10 is operating in a target mode, if both the caller and callee (roaming subscriber) are in the subscriber's home country, the cost-saving routing module 104 checks the call record table 114, and directly establishes the connection between the caller and callee; or if the roaming subscriber rejects the connection to the home gateway and the target PSTN gateway can accept the call-back request from the roaming subscriber, the cost-saving routing module 104 checks the call record table 114, and if the corresponding records are found in the call record table 114 then the cost-saving routing module 104 establishes the connection between the caller and callee. If the call record table 114 does not have any corresponding information, the call-back request is routed to the home PSTN gateway.

If the PSTN gateway 10 operating in the originating mode receives a call-back request first and then receives a rejection from the roaming subscriber, the PSTN gateway 10 ignores the rejection.

The PSTN gateway 10 in accordance with one embodiment of the present invention is able to connect to a PSTN. For example, the PSTN gateway 10 is able to connect to a mobile switching center (MSC), a gateway mobile switching center (GMSC) and a switch, etc. In addition, the PSTN gateway 10 is able to connect to a telecom-grade IP network.

The PSTN gateway 10 in accordance with one embodiment of the present invention is compatible with the server utilizing a session initiation protocol (SIP) and a real-time transport protocol (RTP) so that the cost is reduced accordingly.

Figure 2:
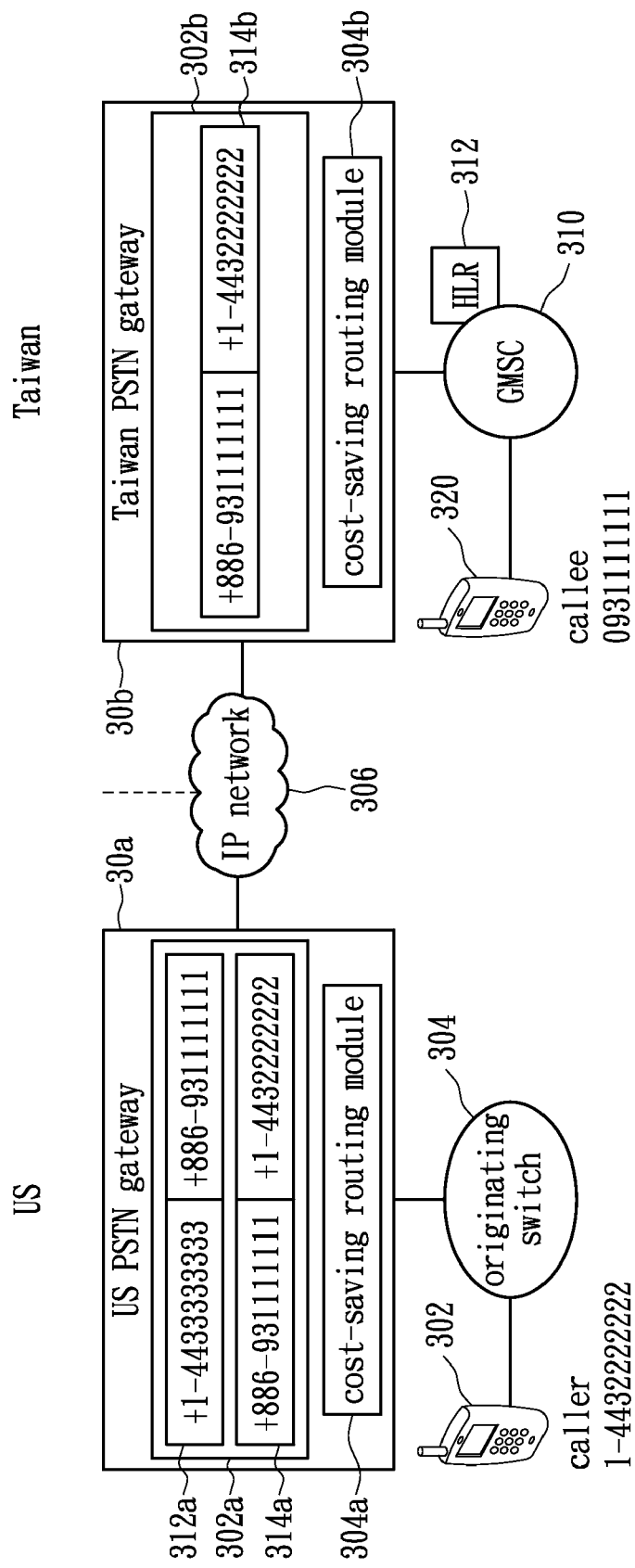
FIG. 2 shows a first embodiment of the present invention, in which the PSTN gates are utilized to route an international roaming call so as to achieve the cost-saving objective.

FIG. 2 shows a first embodiment consistent with the present invention, in which the PSTN gates are utilized to route an international roaming call so as to achieve the cost-saving objective. A caller 302 in the United States dials the number +1-4432222222 to reach the roaming subscriber 320, who is currently in Taiwan. First, the caller 302 dials the U.S. fixed network number +1-4433333333 of the roaming subscriber 320. The connection request will reach the U.S. PSTN gateway 30a at the caller's location through an originating switch 304, and this segment of communication is charged on a local call basis. The cost-saving routing module 304a of the U.S. PSTN gateway 30a finds the mobile phone number +886-931111111 through the mapping table 312a in the storage device 302a, and notices the Taiwan PSTN gateway 30b in the subscriber's home country through an IP network 306. This segment of communication goes through a network rather than through an international call, and thus the cost is reduced. The cost-saving routing module 304b of the Taiwan PSTN gateway 30b reconnects to the mobile phone of the roaming subscriber 320 through a GMSC 310, and this segment of communication is charged on a local call basis.

Figure 3:
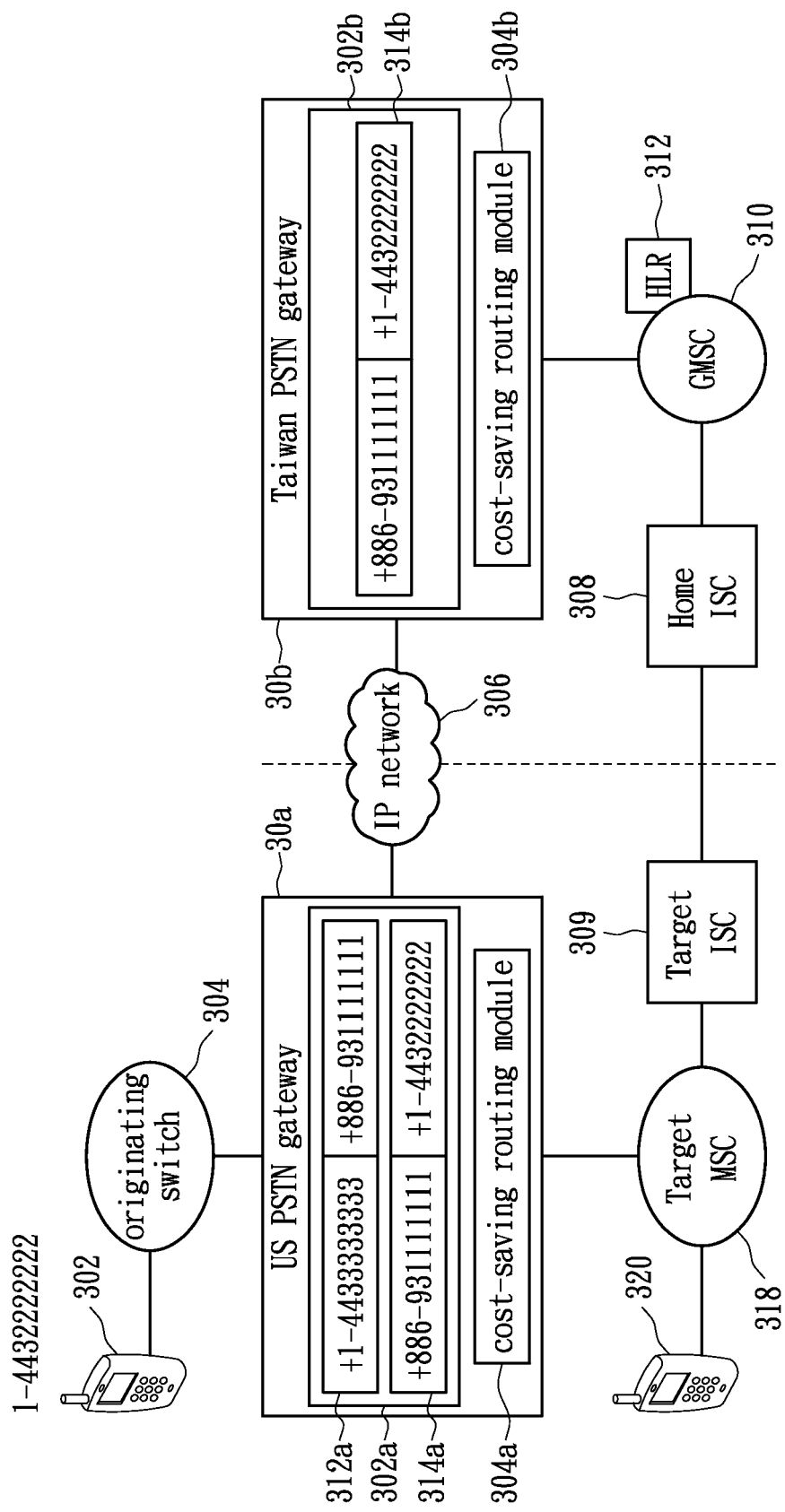
FIG. 3 shows a second embodiment of the present invention, in which the PSTN gates are utilized to route an international roaming call so as to achieve the cost-saving objective.

FIG. 3 shows a second embodiment consistent with the present invention, in which the PSTN gates are utilized to route an international roaming call so as to achieve the cost-saving objective. In this embodiment, the caller 302 in the United States calls the roaming subscriber 320 who is also in the United States by dialing the phone number +1-4432222222. First, the caller 302 dials the U.S. fixed network number +1-4433333333 of the roaming subscriber.

The cost-saving routing module 304a of the U.S. PSTN gateway 30a finds the subscriber's mobile number through the mapping table 312a in the storage device 302a, and based on the country code of the mobile phone number notices the home PSTN gateway 30b through the IP network 306. The originating PSTN gateway 30a and home PSTN gateway 30b separately establish a set of call record tables 314a, 314b to record the caller's mobile phone number and roaming subscriber's mobile phone number. Because the roaming subscriber 320 is also in the United States, the Taiwan PSTN gateway 30b establishes the connection with the mobile phone of the roaming subscriber 320 currently in the United States sequentially through the GMSC 310, an international switching center (ISC) 308, a U.S. ISC 309 and a target MSC 318. The mobile phone of the roaming subscriber 320 will reject an incoming call from the Taiwan PSTN gateway 30b, and call back to U.S. PSTN gateway 30a in the place where the subscriber is roaming to establish a connection. The cost-saving routing module 304a of the U.S. PSTN gateway 30a learns by inquiring the call record table 314a that the caller 302 intends to establish a connection with the roaming subscriber 320, and thus establishes the connection accordingly. After the Taiwan PSTN gateway 30b receives a rejection from the roaming subscriber 320, the call-back timer is actuated. The cost-saving routing module 304b clears the call record table 314b after the call-back timer 116 expires.

As in FIG. 2, this embodiment incurs only the costs of two local calls and one network call. In implementing the design, the mobile phone of the roaming subscriber 320 can build in a function of rejecting incoming calls and automatically calling back.

Figure 4:
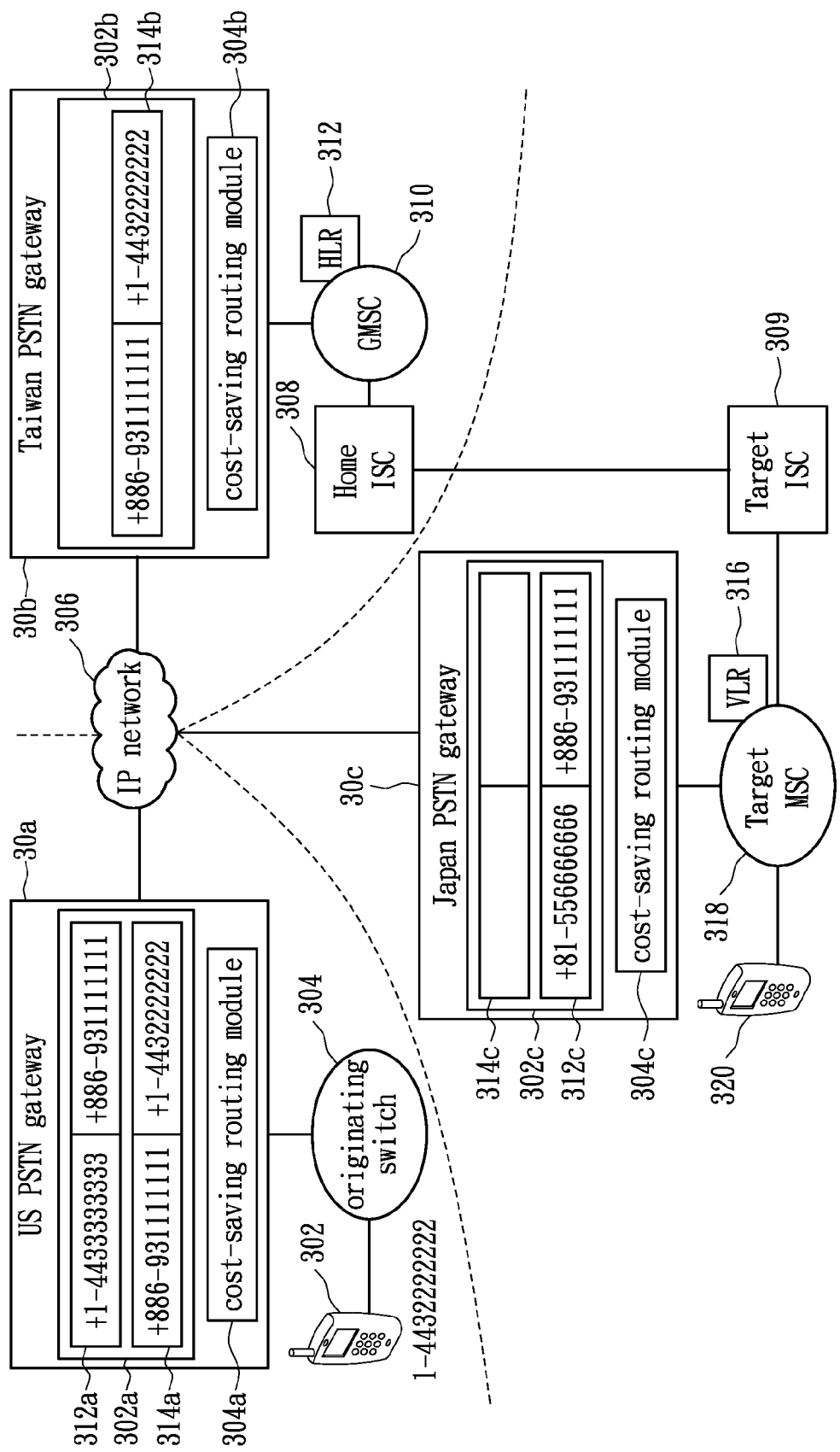
FIG. 4 shows a third embodiment of the present invention, in which the PSTN gates are utilized to route an international roaming call so as to achieve the cost-saving objective.

FIG. 4 shows a third embodiment consistent with the present invention, in which the PSTN gates are utilized to route an international roaming call so as to achieve the cost-saving objective. In this example, the caller 302 in the United States calls the roaming subscriber 320 in Japan by dialing the phone number +1-4432222222. First, the caller 302 dials the U.S. fixed network number +1-4433333333 of the roaming subscriber, and notices the Taiwan PSTN gateway 30b through the IP network 306. The originating PSTN gateway 30a and the home PSTN gateway 30b separately build a call record table 314a and 314b to record the caller's mobile phone number and the roaming subscriber's mobile phone number. The cost-saving routing module 304b of the Taiwan PSTN gateway 30b establishes a connection with the mobile phone of the roaming subscriber 320 through the GMSC 310, a home location register (HLR) 312, a home ISC 308, a target international gateway 309 and a visitor location register (VLR) 316, where the GMSC 310 installs a standard mobile phone call setup procedure and the VLR 316 retrieves a mobile station roaming number (MSRN). After the mobile phone of the roaming subscriber 320 receives the request for establishing the connection, the mobile phone of the subscriber 320 rejects the call from the Taiwan PSTN gateway 30b and then calls back to the local Japanese PSTN gateway 30c. When the home Taiwan PSTN gateway 30b receives the rejection from the roaming subscriber 320, a call-back timer is actuated. If the roaming subscriber 320 does not call back within a predetermined time frame, the call will be cancelled.

When receiving the call-back request from the roaming subscriber 320, the Japanese PSTN gateway 30c in the location of the roaming subscriber 320 checks whether the call record table 314c has any call record relating to the roaming subscriber 320. If affirmative, it means that the caller is also in the target country. Otherwise, in this example, the caller 302 is determined to be in the United States, and therefore the Japanese PSTN gateway 30c learns by inquiring the number (+886-931111111) of the roaming subscriber 320 that the subscriber's home country is Taiwan and then routes the call-back request to the Taiwan PSTN gateway 30*b* through the IP network 306. If the above call-back request is received before the expiry of the call-back timer, the cost-saving routing module inquires the call record table 314*b* in accordance with the caller's phone number and calls back to the caller in the United States. However, if the above call-back request is received after the expiry of the call-back timer, the cost-saving routing module 304*b* clears the call record table 314*b* and releases the connection between the caller 302 and the roaming subscriber 320.

When receiving the call-back request from the roaming country, the home Taiwan PSTN gateway 30*b* identifies the caller's phone number and country in accordance with the call record, and then reroutes the call to the U.S. PSTN gateway 30*a* through the IP network 306. The cost-saving routing module 304*a* of the U.S. PSTN gateway 30*a* learns by inquiring the call record table 314*a* that the caller 302 intends to make a connection with the roaming subscriber 320. When the U.S. PSTN gateway 30*a* establishes the call-back connection, the call path, which previously would have gone through two international trunks, is reduced to two local calls and one Voice over IP (VoIP) call, and therefore the original charge of international calls is largely reduced.

Figure 5:
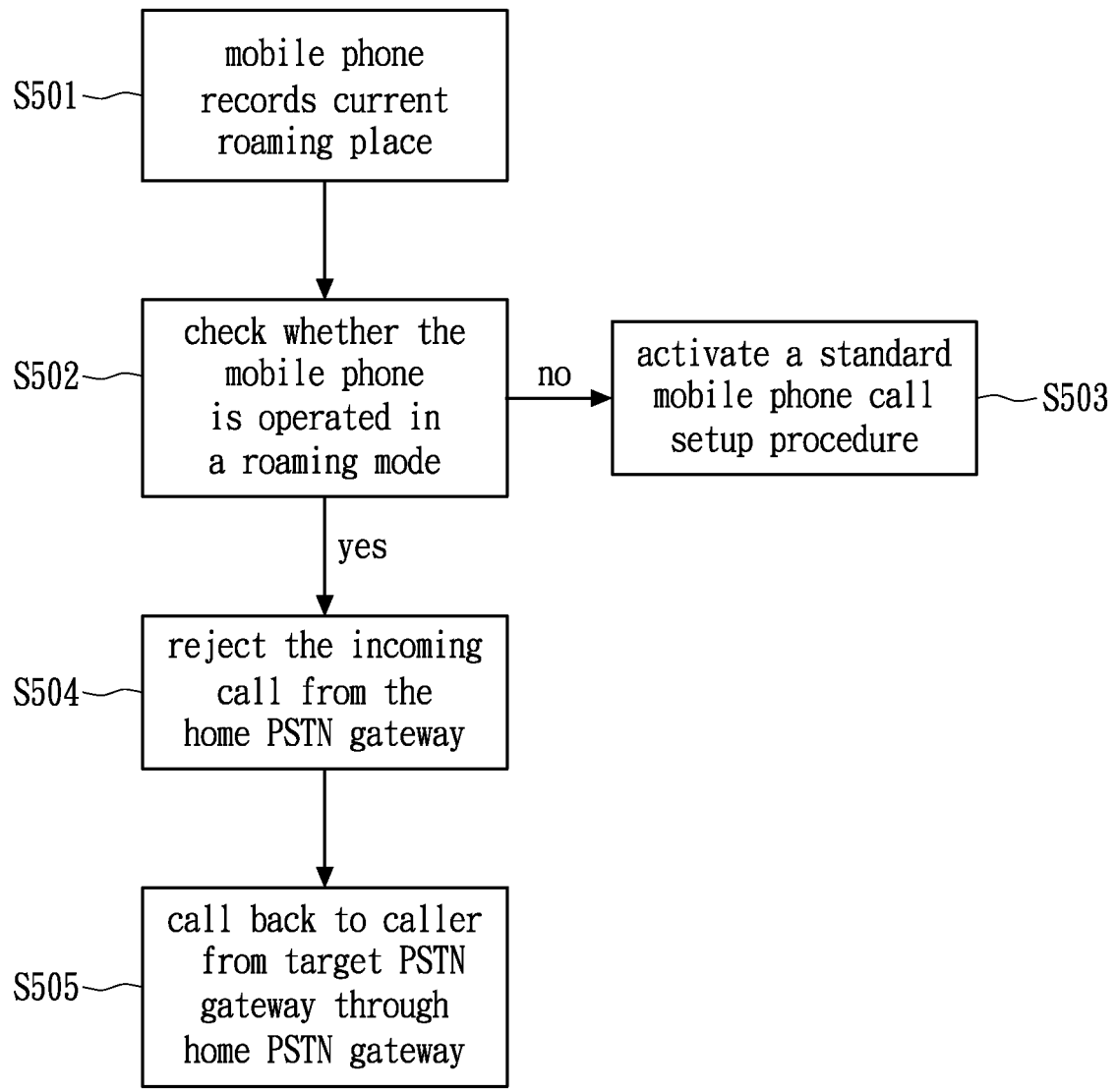
FIG. 5 shows a flow chart of a cost-saving routing mechanism in accordance with the present invention.

FIG. 5 shows a flow chart of a cost-saving routing mechanism in accordance with the present invention. In step S501, the mobile phone of the roaming subscriber records the current location. In step S502, when receiving an incoming call, the mobile phone of the roaming subscriber checks whether it is operating in a roaming mode. If affirmative, the mobile phone of the roaming subscriber transmits a rejection signal to the home PSTN gateway, as shown in Step S504. Subsequently, the mobile phone of the roaming subscriber calls back to the target PSTN gateway, asking to establish a connection through the home PSTN gateway, and ringing the subscriber's mobile phone, as shown in step S505.

In another embodiment of the present invention, to capture the current roaming country, e.g. a country code as in step S501, the AT+COPS command of the AT command set can be used. Alternatively, the current roaming country can be captured by the lineGetCurrentOperator function of Windows Mobile/CE Extended Telephony Application Programming Interface (TAPI). In step S503, if operating in a non-roaming mode, i.e. when the callee is not currently in his or her home country, a standard mobile phone setup program is actuated.

Figure 6:
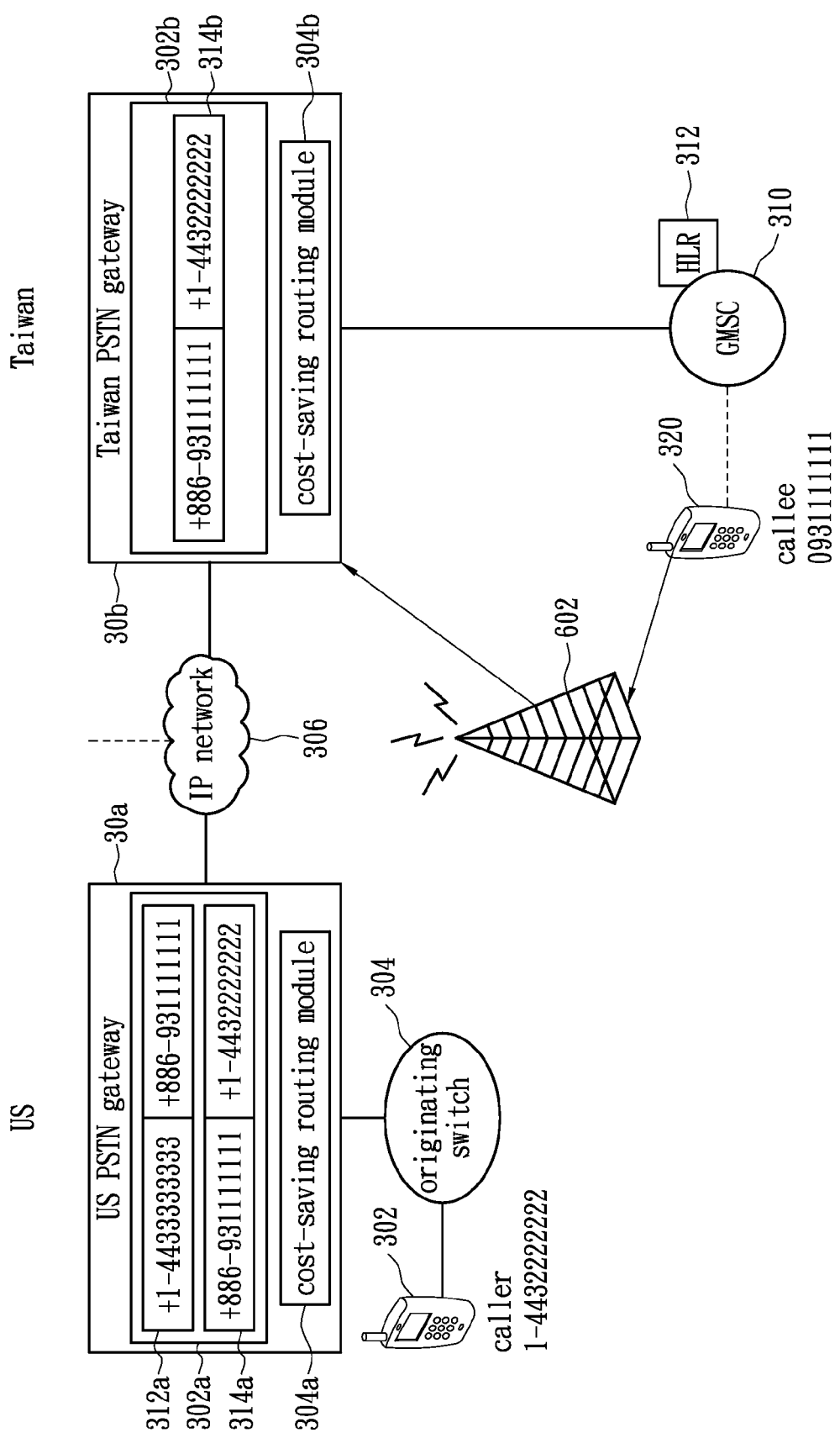
FIG. 6 shows a dual-network mobile phone having a wireless connection function.

The present mobile phone features a mechanism of cutting off an international call and automatically calling back to the PSTN gateway. In addition, to further achieve the cost-saving objective, a dual-network mobile phone having a wireless connection function as shown in FIG. 6 can be used. Referring to FIG. 2, when receiving an international call, the roaming subscriber 320 can connect to a wireless network base station 602 to call back in a wireless mode. Because this local call is routed by a wireless network, the dialing cost can be further reduced.

The exemplary embodiment consistent with the present invention does not change the way the subscribers usually use their mobile phones, and simultaneously retains the convenience of international roaming. Unlike many products on the market, the present invention achieves the cost-saving objectives both in originating and in target ends. As far as the deploying hardware expense is concerned, compared to existing products, the present invention features a low cost and is compatible with existing equipment and therefore can be adopted by the industry right away.

The above-described embodiments consistent with the present invention are intended to be illustrative only. Numerous alternative embodiments may be devised by persons skilled in the art without departing from the scope of the following claims.

What is claimed is:

1. A gateway for routing an international mobile telephone call, comprising:
   a storage device configured to store a mapping table and a call record table, wherein the mapping table records a mobile phone number of a roaming subscriber and a fixed network number, and the call record table records a caller's phone number and the mobile phone number of the roaming subscriber; and
   a cost-saving routing module configured to establish a connection in accordance with the mapping table and call record table.

2. The gateway of claim 1, wherein if the gateway is operating in an originating mode, the cost-saving routing module checks the call record table and establishes a connection between an originating end and the roaming subscriber through the Internet and a home public switched telephone system (PSTN) gateway.

3. The gateway of claim 1, wherein if the gateway is operating in a target mode and both a caller and callee are in the subscriber's home country, the cost-saving routing module checks the call record table and directly establishes a connection between an originating end and the roaming subscriber.

4. The gateway of claim 1, wherein if the gateway is operating in a target mode and the roaming subscriber rejects a connection to a home public switched telephone system (PSTN) gateway, the cost-saving routing module checks the call record table; and if the call record table has records, the cost-saving routing module establishes a connection between an originating end and the roaming subscriber.

5. The gateway of claim 1, wherein if the gateway is operating in a target mode and the roaming subscriber rejects a connection to a home public switched telephone system (PSTN) gateway, the cost-saving routing module checks the call record table; and if the call record table has no records, the cost-saving routing module routes a call-back request to the home PSTN gateway.

6. The gateway of claim 1, wherein if the gateway is operating in a home mode and accepts a connection request from an originating public switched telephone system (PSTN) gateway or a caller, the cost-saving routing module checks the call record table and establishes a connection between an originating end and the roaming subscriber.

7. The gateway of claim 1, wherein if the gateway is operating in a home mode, the cost-saving routing module actuates a call-back timer after receiving a rejection from the roaming subscriber; and if the call-back request is received before the call-back timer expires, the cost-saving module calls back to the originating end in accordance with the caller's phone number and the call record table.

8. The gateway of claim 1, wherein if the gateway is operating in a home mode, the cost-saving routing module actuates a call-back timer after receiving a rejection from the roaming subscriber; and if the call-back request is not received before the call-back timer expires, the cost-saving routing module clears the call record table and rejects a connection between an originating end and the roaming subscriber.

9. The gateway of claim 7, wherein the roaming subscriber issues the rejection after receiving an incoming roaming call.

10. The gateway of claim 9, wherein the call-back request occurs after the roaming subscriber issues the rejection.

11. The gateway of claim 1, wherein the gateway for routing an international mobile telephone call is connected to a public switched telephone system (PSTN) gateway.

12. The gateway of claim 1, wherein the gateway for routing an international mobile telephone call is a session initiation protocol server or a real-time transport protocol server.

13. The gateway of claim 1, wherein the gateway for routing an international mobile telephone call is connected to a telecom-grade IP network.

14. A method for routing an international mobile telephone call, comprising the steps of:
   recording a mobile phone number of a roaming subscriber and a fixed network number by a mapping table; and
   recording a caller's phone number and the mobile phone number of the roaming subscriber by a call record table,
   wherein the method for routing the international mobile telephone call is implemented in a public switched telephone system (PSTN) gateway.

15. The method of claim 14, if the public switched telephone system (PSTN) gateway performing the recording steps is operating in an originating mode, further comprising the steps of:
   determining the call record table; and
   establishing a connection between an originating end and the roaming subscriber through the Internet and a home PSTN gateway.

16. The method of claim 14, if the public switched telephone system (PSTN) gateway performing the recording steps is operating in a target mode and both a caller and a callee are in the subscriber's home country, further comprising the step of determining the call record table to directly establish a connection between an originating end and the roaming subscriber.

17. The method of claim 14, if the public switched telephone system (PSTN) gateway performing the recording steps is operating in a target mode and the roaming subscriber rejects a connection to the home PSTN gateway, further comprising the steps of:
   determining the call record table; and
   establishing a connection between an originating end and the roaming subscriber if the call record table has records.

18. The method of claim 14, if the public switched telephone system (PSTN) gateway performing the recording steps is operating in a target mode and the roaming subscriber rejects a connection to the home PSTN gateway, further comprising the steps of:
   determining the call record table; and
   routing a call-back request to the home PSTN gateway if the call record table has no records.

19. The method of claim 14, if the public switched telephone system (PSTN) gateway performing the recording steps is operating in a home mode and accepts a connection request from the originating PSTN gateway or from the caller, further comprising the steps of:
   determining the call record table; and
   establishing a connection between an originating end and the roaming subscriber.

20. The method of claim 14, if the public switched telephone system (PSTN) gateway performing the recording steps is operating in a home mode and accepts a rejection from the roaming subscriber, further comprising the steps of:
   actuating a call-back timer; and
   inquiring the call record table in accordance with the caller's phone number to call back to an originating end if a call-back request is received before the call-back timer expires.

21. The method of claim 14, if the public switched telephone system (PSTN) gateway performing the recording steps is operating in a home mode and accepts a rejection from the roaming subscriber, further comprising the steps of:
   actuating a call-back timer; and
   clearing the call record table and rejecting a connection between an originating end and the roaming subscriber if a call-back request is not received before the call-back timer expires.

22. The method of claim 21, further comprising the step of rejecting an incoming call after the roaming subscriber receives the incoming call, wherein the call-back request occurs after the roaming subscriber rejects the incoming call.

23. A method for routing an international mobile telephone call and controlling roaming setup of a mobile phone, comprising the steps of:
   recording a current location;
   determining whether the mobile phone is operating in a roaming mode after the mobile phone receives an incoming call from a caller;
   issuing a rejection if the determining result is affirmative; and
   calling back to a target public switched telephone system (PSTN) gateway to establish a connection between the mobile phone and the caller.

24. The method of claim 23, wherein in the calling back step the connection between the mobile phone and the caller is established through a home PSTN gateway.

25. The method of claim 23, further comprising the step of determining whether the mobile phone is operating in a roaming mode after the incoming call is received at the current location; and if the answer is affirmative, a standard mobile phone setup procedure is actuated.

26. The method of claim 23, wherein in the recording step an AT command set is used to retrieve information of the current location.

27. The method of claim 26, wherein in the recording step Windows Mobile/CE Extended Telephony Application Programming Interface is used to retrieve information of the current location.

28. The method of claim 23, wherein the mobile phone features a wireless connection, and is active in a wireless mode if available.

* * * * *